United States Patent
Haugan

(10) Patent No.: US 10,505,479 B2
(45) Date of Patent: Dec. 10, 2019

(54) SYNCHRONOUS GENERATOR CONTROL, GENERATOR SYSTEM AND VESSEL ENERGY SYSTEM

(71) Applicant: SIEMENS AKTIENGESELLSCHAFT, München (DE)

(72) Inventor: Espen Haugan, Trondheim (NO)

(73) Assignee: SIEMENS AKTIENGESELLSCHAFT, München (DE)

( * ) Notice: Subject to any disclaimer, the term of this patent is extended or adjusted under 35 U.S.C. 154(b) by 35 days.

(21) Appl. No.: 14/398,701

(22) PCT Filed: Mar. 25, 2013

(86) PCT No.: PCT/EP2013/056185
§ 371 (c)(1),
(2) Date: Nov. 3, 2014

(87) PCT Pub. No.: WO2013/164138
PCT Pub. Date: Nov. 7, 2013

(65) Prior Publication Data
US 2015/0123625 A1    May 7, 2015

(30) Foreign Application Priority Data
May 4, 2012    (EP) ..................... 12166857

(51) Int. Cl.
*H02P 9/00* (2006.01)
*B63H 21/17* (2006.01)
*H02H 7/06* (2006.01)

(52) U.S. Cl.
CPC ............. *H02P 9/006* (2013.01); *B63H 21/17* (2013.01); *H02H 7/06* (2013.01)

(58) Field of Classification Search
CPC ............ H02P 9/006; H02H 7/06; B63H 21/17
(Continued)

(56) References Cited

U.S. PATENT DOCUMENTS

| | | | | |
|---|---|---|---|---|
| 4,219,739 A | * | 8/1980 | Greenwell | ............... F02N 11/04 |
| | | | | 290/38 R |
| 4,280,085 A | * | 7/1981 | Cutler | ..................... H02P 27/06 |
| | | | | 318/798 |

(Continued)

FOREIGN PATENT DOCUMENTS

| DE | 3730829 A1 | 3/1989 |
|---|---|---|
| DE | 19958934 A1 | 11/2000 |

(Continued)

OTHER PUBLICATIONS

European Office Action for European Application No. 12166857.8, mailed Sep. 11, 2012.

(Continued)

*Primary Examiner* — Julio C. Gonzalez
(74) *Attorney, Agent, or Firm* — Lempia Summerfield Katz LLC

(57) ABSTRACT

An arrangement for controlling a synchronous generator having a stator comprising at least one stator winding and having a rotor with an electromagnet driven by a field current is provided. The rotor is rotatable relative to the stator. The electromagnet is inductively coupled to the at least one stator winding. The arrangement includes a measurement system configured to measure at least one quantity and a controller configured to cause shutting down the field current when the at least one quantity satisfies at least one criterion associated with at least one malfunction.

6 Claims, 3 Drawing Sheets

(58) Field of Classification Search
USPC ......... 322/24, 28, 44, 59; 310/68 C; 361/24, 361/25
See application file for complete search history.

(56) References Cited

U.S. PATENT DOCUMENTS

| | | | |
|---|---|---|---|
| 5,805,394 A * | 9/1998 | Glennon | H02H 7/06 322/37 |
| 6,188,591 B1 | 2/2001 | Ruter et al. | |
| 6,268,986 B1 | 7/2001 | Kobayashi et al. | |
| 6,850,043 B1 * | 2/2005 | Maddali | H02H 7/065 322/22 |
| 7,768,226 B2 * | 8/2010 | Fukamizu | H02P 6/182 318/400.01 |
| 8,232,751 B2 * | 7/2012 | Iwaji | H02P 6/187 318/400.02 |
| 2006/0044710 A1 | 3/2006 | Beneditz et al. | |
| 2008/0180069 A1 * | 7/2008 | Sato | H02P 9/48 322/27 |
| 2009/0028532 A1 * | 1/2009 | El-Antably | H02P 6/10 388/819 |
| 2009/0102437 A1 * | 4/2009 | Nakagawa | H02P 9/48 323/217 |
| 2009/0296777 A1 | 12/2009 | Fish | |
| 2010/0019738 A1 * | 1/2010 | Basic | H02P 29/0055 322/23 |
| 2012/0098503 A1 * | 4/2012 | Horihata | H02P 9/08 322/23 |
| 2013/0027002 A1 * | 1/2013 | Rajashekara | H02P 21/06 322/89 |

FOREIGN PATENT DOCUMENTS

| | | |
|---|---|---|
| DE | 102009025858 A1 | 12/2009 |
| DE | 102011054375 A1 | 4/2012 |
| EP | 0740392 A2 | 10/1996 |
| EP | 1012943 B1 | 11/2005 |
| EP | 1614621 B1 | 5/2010 |
| EP | 1914162 B1 | 6/2010 |
| JP | 2000134790 A | 5/2000 |
| JP | 2005295626 A | 10/2005 |
| KR | 20090076819 A | 7/2009 |
| WO | WO2010006077 A1 | 1/2010 |
| WO | WO2010060777 A2 | 6/2010 |

OTHER PUBLICATIONS

PCT International Search Report and Written Opinion of the International Searching Authority dated Apr. 3, 2014 for corresponding PCT/EP2013/056185.
PCT Notification of Transmittal of preliminary report on patentability dated Aug. 28, 2014 for corresponding PCT/EP2013/056185.
Korean Notice of Preliminary Rejection for related Korean Application No. (PCT) 10-2014-7033917 dated Sep. 20, 2019.

* cited by examiner

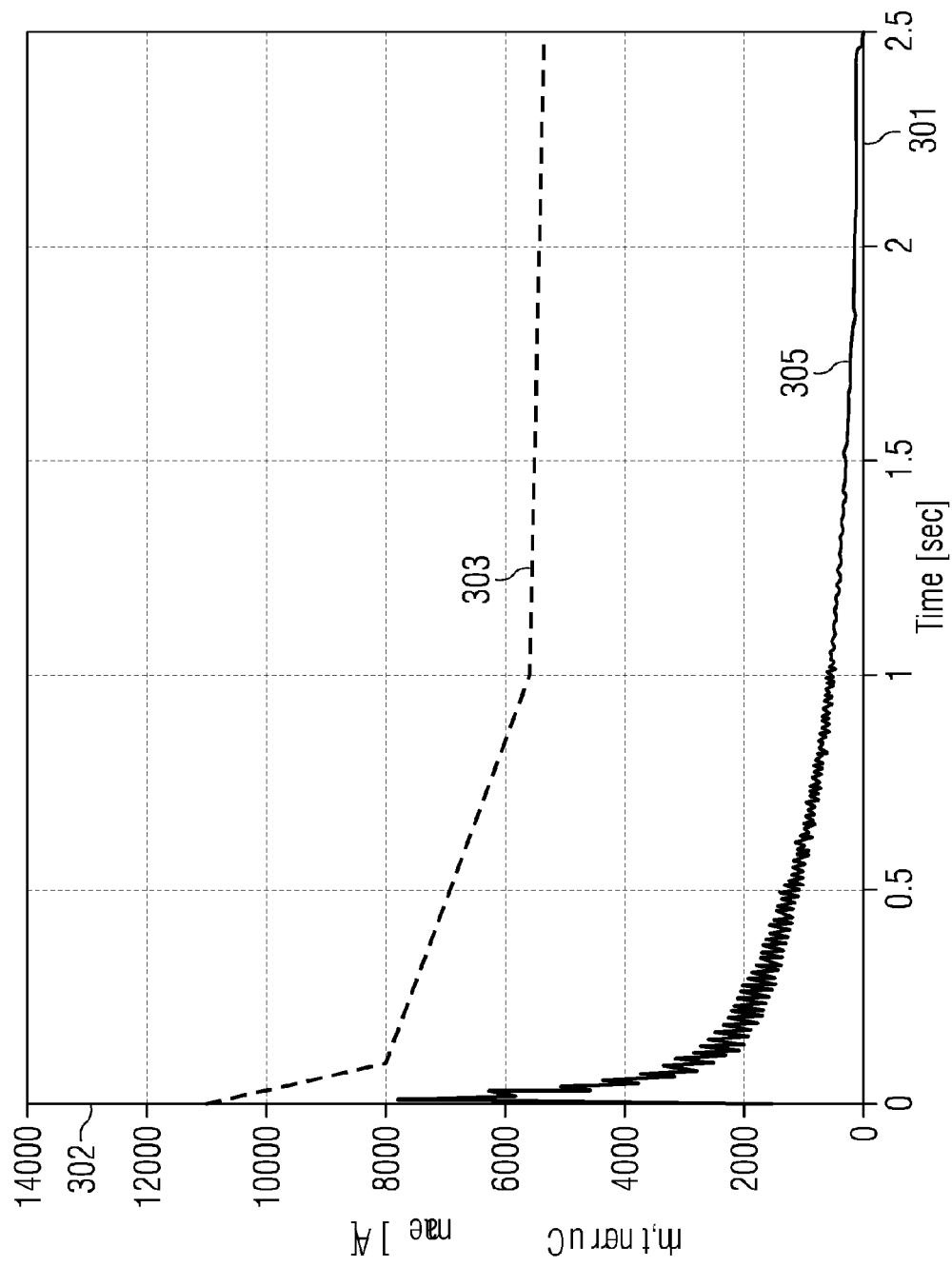

SYNCHRONOUS GENERATOR CONTROL, GENERATOR SYSTEM AND VESSEL ENERGY SYSTEM

This application is the National Stage of International Application No. PCT/EP2013/056185, filed Mar. 25, 2013, which claims the benefit of EP 12166857.8, filed May 4, 2012. The entire contents of these documents are hereby incorporated herein by reference.

FIELD

The present embodiments relate to an arrangement for controlling a synchronous generator, to a generator system including the arrangement, and to a vessel energy system including the generator system.

BACKGROUND

EP 1 012 943 B1 discloses a system for supplying electromotive consumers with electric energy, where a Diesel motor drives an AC generator connected to a rectifier in order to provide a DC energy stream.

EP 1 614 621 B1 discloses an electric power supply system for ships having a generator and consumers.

EP 1 914 162 B1 discloses a DC power distribution system that may be used for marine power and propulsion systems, where a Diesel engine drives a generator to supply power to an output converter.

WO 2010/06077 A2 discloses a power distribution system including a plurality of generator systems each including an alternating current generator directly connected to a rectifier.

Conventional power distribution systems do not in all situations operate in a safe and reliable manner.

SUMMARY AND DESCRIPTION

The scope of the present invention is defined solely by the appended claims and is not affected to any degree by the statements within this summary.

The present embodiments may obviate one or more of the drawbacks or limitations in the related art. For example, control of a synchronous generator, where the system operates in a safe and reliable manner (e.g., in case of a fault or malfunction of one or more components of the system or of an external component), is provided.

According to an embodiment, an arrangement for controlling a synchronous generator having a stator including at least one stator winding and having a rotor with an electromagnet driven by a field current is provided. The rotor is rotatable relative to the stator. The electromagnet is inductively coupled to the stator winding. The arrangement includes a measurement system adapted to measure at least one quantity, and a controller adapted to cause shutting down the field current if the quantity satisfies at least one criterion associated with at least one malfunction.

The at least one quantity may include at least one quantity indicative of a operating condition of a rectifier circuit connected to the output terminal of the stator winding.

The arrangement may not include the synchronous generator. The arrangement is however adapted for controlling the synchronous generator.

The synchronous generator generates at an output terminal an AC energy stream (e.g., voltage and/or current) that has the same frequency as the frequency of the rotor rotating relative to the stator. The synchronous generator may, for example, be a singly fed electric generator or a doubly fed electric generator. The electric energy is generated upon rotation of the rotor, where by induction, a voltage is induced in the stator winding due to the rotation (e.g., movement) of the electromagnet of the rotor. For example, the synchronous generator does not include a permanent magnet, but instead includes an electromagnet that, due to the field current, generates a magnetic field. The magnetic field then induces (e.g., at the stator winding) the voltage representing the electric power output stream.

For example, the synchronous generator may include a stator having three stator windings (e.g., formed by wire portions) arranged at different circumferential positions of the stator. The three windings (e.g., one per phase) are composed of three separate wires that may be connected in a starlike manner or a triangle-like manner.

The electromagnet of the rotor may include a core (e.g., a ferromagnetic core), in which a magnetic field is generated upon flow of the field current through a coil of the electromagnet. The field current may, for example, be a DC-field current. The rotor may be supported using a bearing.

The measurement system may include one or more measurement sensors arranged at one or more positions of the synchronous generator or at one or more positions of further or external components, such as a generator rectifier, a load, etc. The quantity may, for example, include an electrical quantity. The controller may generate, for example, upon receiving the quantity, a control signal that may be supplied to a further circuitry. The further circuitry then indirectly shuts down the field current.

Shutting down the field current may shut down or at least reduce a magnetic field generated by the electromagnet when the field current is flowing through the electromagnet. Thus, shutting down the field current may result in a reduction of the magnetic field and may even lead to a vanishing magnetic field a short time (e.g., between 0.5 s and 3 s) after shutting down the field current. However, the magnetic field may sustain a while after shutting down the field current due to remanence of the electromagnet. However, the remanence may only lead to a relatively small magnetic field, which may not induce a significant voltage at the stator winding.

Thereby, upon shutting down the field current, the energy stream output by the synchronous generator at the output terminal or, for example, three output terminals may be reduced to a small value (e.g., to zero). Thereby, in case of a malfunction (e.g., of the arrangement or any external component connected indirectly or directly with the arrangement; output current) may be interrupted or shut off in order to provide a protection function for protecting the arrangement or any external component connected directly or indirectly with the arrangement. Thereby, a safe and reliable operation of the synchronous generator may be provided.

For example, the synchronous generator may be mechanically connected or coupled to a combustion engine, such as a Diesel generator. For example, the synchronous generator may provide an output energy stream of the synchronous generator to a rectifier in order to enable setting up a DC distribution system. Setting up or providing a DC energy distribution system may provide the advantage to run the generator with variable speed, which may result in a reduced fuel consumption and pollution, reduced costs of the system and decreasing maintenance efforts required on the Diesel engines.

For example, when the synchronous generator is connected at an output terminal of the synchronous generator to a rectifier, the protection function is realized by shutting off or stopping the magnetic field supply to the generator magnetization (e.g., the electromagnet of the rotor).

In an embodiment, the quantity is indicative of a temperature of a rectifier circuit connected at the output terminal of the stator winding, where the at least one criterion includes that the temperature is greater than a temperature threshold.

The quantity relating to the rectifier circuit operating condition may additionally or alternatively include a quantity indicative of a DC voltage between DC output terminals of the rectifier circuit. The at least one criterion may include that the DC voltage drops below a voltage threshold, which may, for example, occur upon the occurrence of a fault in a component electrically coupled to the DC output terminals of the rectifier circuit (e.g., a fault on a DC bus or in a component coupled thereto).

In an embodiment, the at least one quantity may further include a quantity indicative of an operating condition of a magnetization circuit (e.g., magnetization circuit current and/or magnetization circuit voltage).

In a further embodiment, the at least one quantity may further include a stator current and an output current measured for the stator winding to obtain a current difference for providing differential protection for the stator winding.

In an embodiment, the measurement system is adapted to measure at least one quantity including a quantity relating to the rectifier circuit operating condition, a quantity indicative of an operating condition of the magnetization circuit and stator current and an output current. A comprehensive protection of the generator and of the rectifier circuit coupled thereto may thus be achieved.

Monitoring or measuring the temperature of the rectifier may provide an appropriate indication whether the rectifier is in an acceptable operating condition. For example, a failure or malfunction may be indicated by a temperature that supersedes the temperature threshold.

According to an embodiment, the quantity is indicative of a stator winding current, and/or the quantity is indicative of an output current at an AC-output terminal of the stator winding. The at least one criterion includes that the stator current is above a stator current threshold and/or that the output current is above an output current threshold. The malfunction is a short circuit state of a load or network connected to the output terminal.

The stator winding current may include three stator winding current portions, each being associated with a respective one of three stator windings. Further, the output current may be represented by three output current portions each being associated with one of three output terminals corresponding to three output phases. In an intact synchronous generator, the stator winding current may be at least approximately equal to the output current. However, if there are some problems with the synchronous generator (e.g., with the stator winding or stator windings), the stator winding current may be different from the output current. The stator winding current may be measured at one or more positions at the stator winding, and/or the output current may be measured at one or more positions close or at the output terminal.

The stator current threshold may be determined, for example, based on electrical properties of components that are connected at the output terminals. Also, the output current threshold may be determined based on electrical properties of one or more components connected to the output terminals. For example, the current threshold may be determined based on current limits of one or more components connected to the output terminals. Thereby, the components connected to the output terminals may be protected from damage in case of the short circuit state. For example, the short circuit state may be due to some malfunction or failure in a distribution system (e.g., DC energy distribution system) connected at the output terminal of the synchronous generator.

According to an embodiment, the controller is adapted to integrate a square of the stator winding current and/or of the output current over a certain time range to obtain an integration value, where the at least one criterion includes that the integration value is greater than an integration threshold, and the malfunction is an overload state of a load connected to the output terminal.

For example, the integration threshold may be based on electrical properties (e.g., electrical limits) of one or more components connected to the output terminals. Thereby, overloading of a load connected (e.g., indirectly or directly) at the output terminal may be avoided.

According to an embodiment, the controller is adapted to determine a difference between the stator winding current and the output current to obtain a current difference. The at least one criterion includes that the current difference is greater than a current difference threshold, where the malfunction includes a malfunction of the generator.

The difference of the stator winding current and the output current may be zero or at least approximately zero for an intact stator winding, but may deviate from zero for a stator winding that is not operating in a correct manner. Thereby, a malfunction or failure of the generator may be detected by determining the difference, and the synchronous generator may be shut off (e.g., regarding a power output of the synchronous generator) in order to protect other components or the synchronous generator from damage. Alternatively, a current unbalance detection for detecting different currents for different phases may be implemented.

According to an embodiment, the quantity is indicative of a temperature of a rectifier circuit (e.g., a diode) connected at the output terminal of the stator winding. The at least one criterion includes that the temperature is greater than a temperature threshold, or a change of the temperature is greater that a temperature change threshold.

When a rectifier circuit (e.g., including two diodes connected in series per phase of the output terminals (where each phase is connected between the two diodes connected in series)), the synchronous generator may provide electric energy to a DC energy distribution system. For example, the rectifier may block a reverse current such that it may be enough to shut down the field current, in order to stop the generator output current.

For example, the stator current threshold and/or the output current threshold and/or the integration threshold and/or an output voltage upper threshold and/or an output voltage power threshold and/or a temperature may be based on electrical properties of the diode (e.g., electrical limit values of the diode).

Monitoring or measuring the temperature of the rectifier may provide an appropriate indication whether the rectifier is in an acceptable operating condition. For example, a failure or malfunction may be indicated by a temperature that supersedes the temperature threshold.

According to an embodiment, the quantity is indicative of an output voltage at an AC-output terminal of the stator winding. The at least one criterion includes that the output voltage is greater than an output voltage upper threshold. The malfunction is an overvoltage condition at the output terminal.

The overvoltage may also impair or damage one or more components connected at the output terminals, and by shutting down the output of the synchronous generator, these components may be protected.

According to an embodiment, the quantity is indicative of an output voltage at an AC-output terminal of the stator winding. The at least one criterion includes that the output voltage is smaller than an output voltage lower threshold. The malfunction is an undervoltage condition at the output terminal.

An undervoltage may impair the functionality of an energy distribution system connected directly or indirectly with the output terminals of the synchronous generator. By detecting the undervoltage, impairment of the DC energy distribution system may be avoided or at least reduced.

According to an embodiment, the quantity is indicative of an output frequency of an output voltage or output current at the AC-output terminal of the stator winding. The at least one criterion includes that the output frequency deviates more than a frequency deviation threshold from a target frequency, where the malfunction is an erroneous frequency at the output terminal.

The frequency of the voltage and/or current at the output terminal of the synchronous generator may correspond or may be equal (e.g., at least approximately) to the frequency of rotation of the rotor rotating relative to the stator. However, if the rotation frequency is too low or too high, the driving combustion engine, such as a Diesel engine, may not operate in an optimal working condition. In case of a deviation of the frequency from the target frequency is detected, the combustion engine mechanically driving the synchronous generator may be controlled in order to reestablish the target frequency.

According to an embodiment, a generator system includes an arrangement according to one of the preceding embodiments. The synchronous generator has the stator including the at least one stator winding and has the rotor with the electromagnet driven by the field current. The rotor is rotatable relative to the stator. The electromagnet is inductively coupled to the stator winding. The generator system includes a system for providing the field current, where the controller is adapted to cause shutting down the field current by supplying a control signal to the system for providing the field current.

The system for providing the field current may be configured in different ways. For example, the field current may be provided to the electromagnet by direct electrical contact between an energy source and a coil of the electromagnet or may be provided to the electromagnet of the rotor by inductive coupling, thereby avoiding mechanical contacts between rotating parts and static parts. The controller may be communicatively connected to the system for providing the field current in an optical, electric manner or using radio frequency communication.

The system for providing the field current may be supplied with electric energy also from the output terminal of the synchronous generator. Thereby, a separate energy supply may not be needed. The generator system may, for example, provide electric energy for a DC energy distribution system.

Since the generator system includes the arrangement for controlling the synchronous generator components of the synchronous generator and components connected to the output, terminals of the synchronous generator may be protected from damage as is explained above.

According to an embodiment, the system for providing the field current includes a slip ring mechanically coupled to the rotor and electrically coupled to the electromagnet and a brush contacting the slip ring. Shutting down the field current includes interrupting current flow supplied to the brush.

The brush or the brushes may electrically contact the slip ring. Thereby, a mechanical connection between the brush and the slip ring may be established. Thus, when the brush electrically contacts the slip ring, a current provided to the brush may flow through the slip ring and through the electromagnet of the rotor, where a magnetic field is generated. The magnetic field induces an electric voltage at the stator windings of the stator.

According to an embodiment, the system for providing the field current includes (instead of the slip ring and the brush) a rotating coil mechanically coupled to the rotor, and a rotatable rectifier mechanically coupled to the rotor and electrically coupled to the rotating coil and providing the field current to the electromagnet of the rotor. The system for providing the field current also includes a stator electromagnet inductively coupled to the rotating coil, and a stator electromagnet supply system for supplying an exciting voltage to the stator electromagnet. Shutting down the field current includes interrupting the exciting voltage to the stator electromagnet.

Upon rotation of the rotating coil (e.g., connected to the rotor), the stator electromagnet induces a voltage in the rotating coil, thereby establishing an AC-signal that is rectified using the rotatable rectifier and is then supplied as a DC-field current to the electromagnet of the rotor.

The stator electromagnet is driven by a stator electromagnet supply system. Interrupting the exciting voltage to the stator electromagnet may cause shutting down the field current, since the stator electromagnet will not generate any magnetic field when the exciting voltage is interrupted. Thereby, the output current of the synchronous generator may be shut down in a simple and reliable manner without requiring a particular switch at an output terminal of the generator.

According to an embodiment, the stator electromagnet supply system includes at least one controllable switch (e.g., isolated gate bipolar transistor (IGBT)) driven by a gate driver circuit. Shutting down the field current includes supplying a shut-down signal to the gate driver. The stator electromagnet supply system may, for example, include four controllable switches. Two pairs of series connected controllable switches are connected between two DC-bars. The exciting voltage to the stator electromagnet is tapped at a connection between the two controllable switches in each pair.

The shut-down signal may cause the controllable switches to adapt a non-conducting state. Thereby, the generator output current may be easily switched off.

According to an embodiment, the generator system further includes an emergency stop switch between the at least one controllable switch and the stator electromagnet. The emergency stop switch may also be controlled by the controller of the arrangement for controlling the synchronous generator.

According to an embodiment, the generator system further includes a generator rectifier connected to the AC-output terminal (e.g., three AC-output terminals). The rectifier includes, for example, a diode and a temperature sensor for measuring the temperature of the diode, where, for example, the rectifier is the only load connected to the output terminal of the generator.

The generator rectifier may include six diodes, where three pairs of diodes are arranged in parallel and where between the two diodes of each pair, one output terminal of the stator winding is connected. Thereby, the generator system may setup or establish a DC energy distribution system. The generator rectifier advantageously blocks reverse current.

According to an embodiment, the generator may include separate winding sets and have a respective rectifier connected to each of the separate winding sets.

Further, for example, the generator rectifier may include an isolation switch downstream of the diodes. Because of the diodes, no current may flow back from the DC-output terminal of the generator to the synchronous generator.

According to an embodiment, an energy system (e.g., a vessel energy system or free standing (autarkical) electrical system, drilling system, or industry grid) including a combustion engine for providing mechanical energy is provided. The energy system includes a generator system according to one of the embodiments described above and arranged for converting the mechanical energy to electrical energy. The energy system also includes a DC-distribution system coupled to the a DC-output terminal of the generator rectifier for distributing the electrical energy (e.g., to at least one propulsion motor).

The combustion engine may, for example, include a Diesel engine. The generator system includes the generator rectifier and thus converts the mechanical energy provided by the combustion engine into a DC energy stream. The DC-distribution system may provide the electrical energy in the form of a DC-energy stream to one or more variable speed drives for driving one or more propulsion motors. The vessel may, for example, be a ship or a platform (e.g., an oil platform).

The aspects defined above and further aspects of the present embodiments are apparent from the embodiment to be described hereinafter and are explained with reference to the embodiments. The present embodiments are described in more detail hereinafter with reference to examples to which the invention is not limited.

BRIEF DESCRIPTION OF THE DRAWINGS

FIG. 3 shows an exemplary graph explaining a functionality of an arrangement for controlling a synchronous generator according to an embodiment.

DETAILED DESCRIPTION

Figure 1:
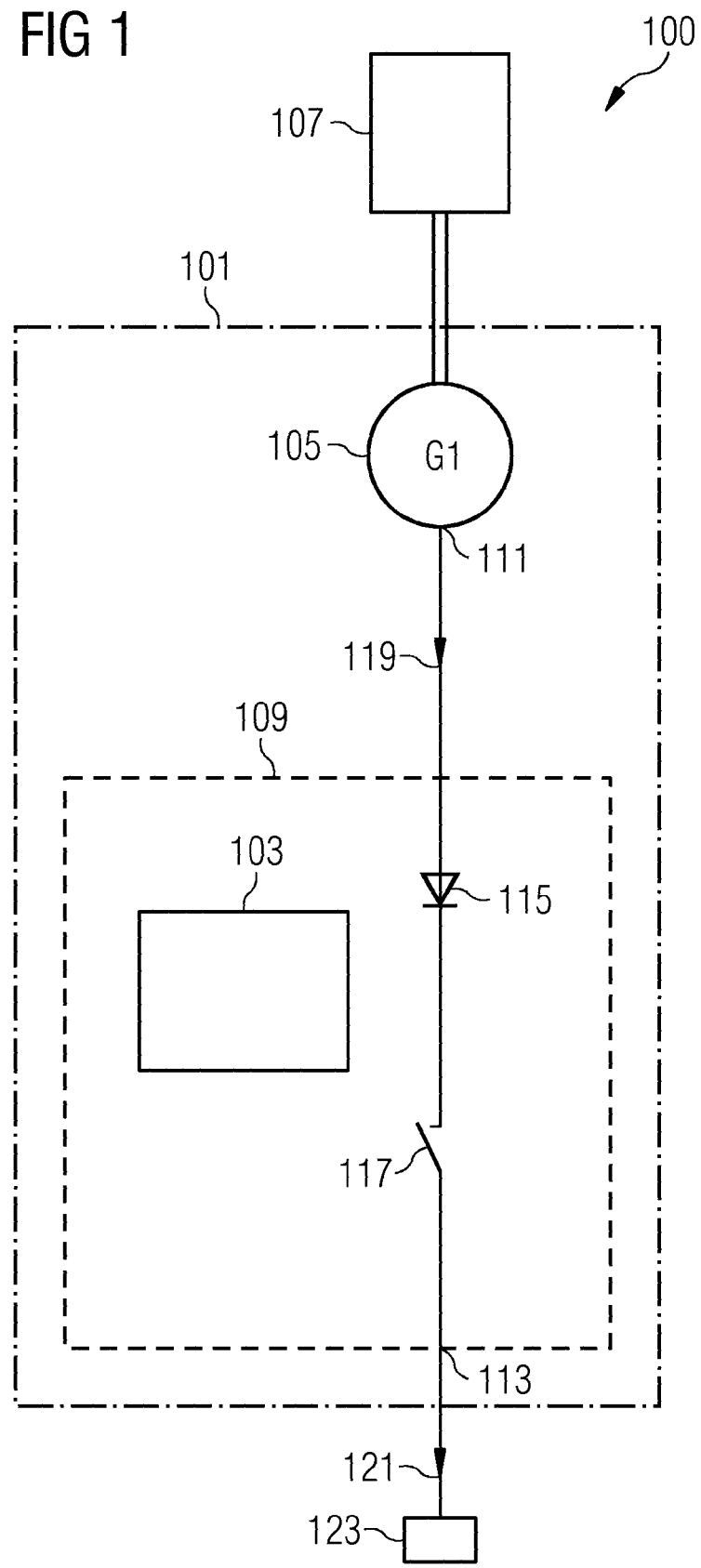
FIG. 1 shows one embodiment of a vessel energy system that includes a generator system.

FIG. 1 illustrates a vessel energy system 100 according to an embodiment. The vessel energy system 100 includes a generator system 101 that includes an arrangement 103 for controlling a synchronous generator 105.

The vessel energy system 100 includes a Diesel engine 107 that is mechanically connected to the generator system 101 (e.g., to the synchronous generator 105 included in the generator system 101). The generator system 101 further includes a generator cubicle 109 that is connected at an output terminal 111 of the generator 105 providing AC-energy stream 119 in order to generate a DC energy stream 121 at an output terminal 113 of the generator cubicle from the AC-energy stream 119 provided at the AC-output terminal 111 of the generator 105. For example, although not illustrated, the generator 105 includes three output terminals 111 providing three phases shifted by 120° relative to each other.

The generator cubicle 109 includes an arrangement 103 for controlling the synchronous generator 105, a rectifier circuit 115 (e.g., a generator rectifier) and an isolation switch 117. The generator rectifier 115 generates from the AC energy stream 119 provided by the generator 105 a DC energy stream 121 that is provided to a DC energy distribution system 123.

The DC energy distribution system 123 may provide electric energy to one or more propulsion motors, for example, on a vessel, a ship or a platform at the sea.

Figure 2:
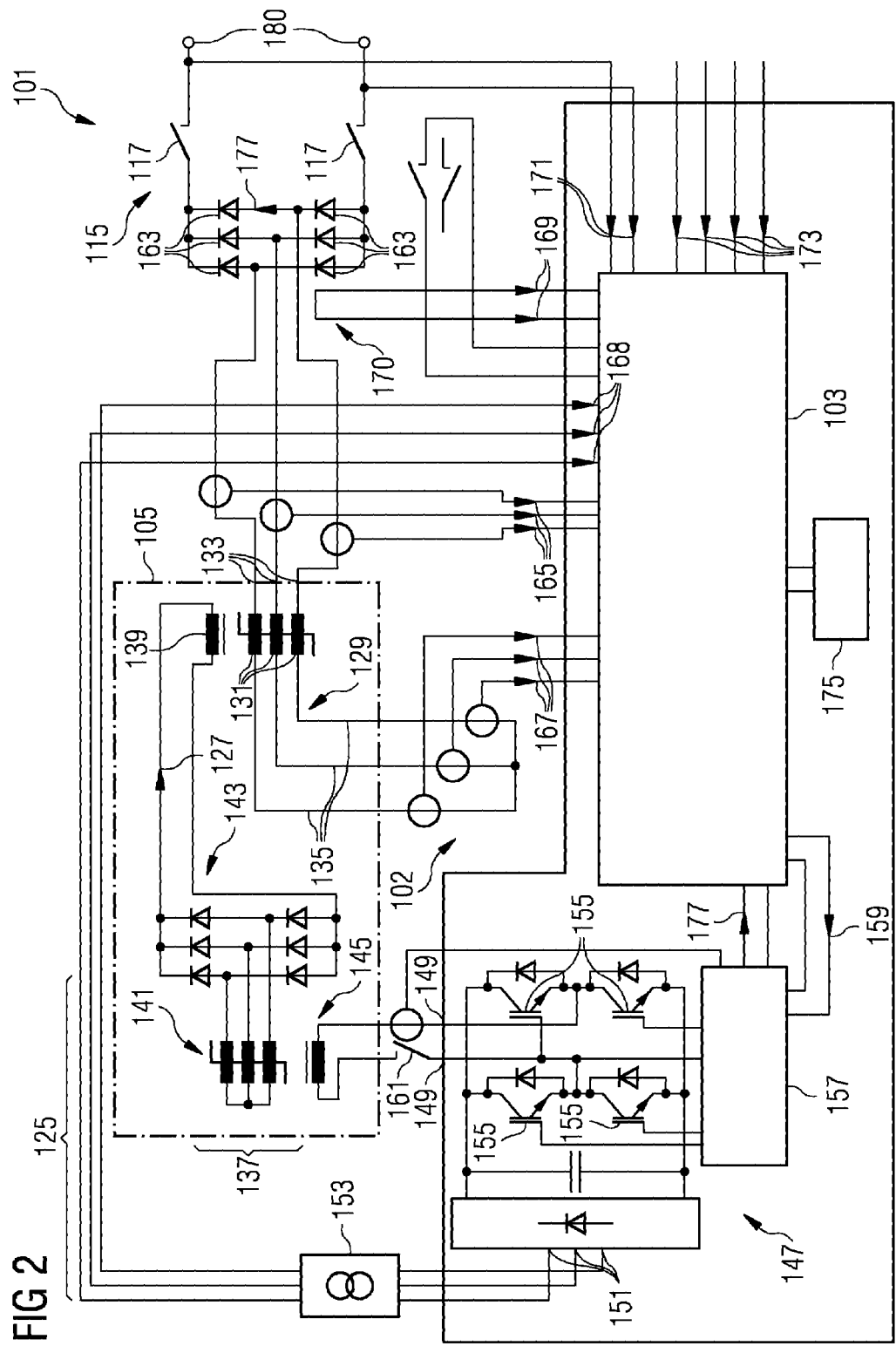
FIG. 2 shows one embodiment of the generator system, which is included in the vessel energy system illustrated in FIG. 1.

FIG. 2 illustrates the generator system 101 illustrated in FIG. 1 in more detail.

The generator system 101 includes the generator 105, the rectifier circuit 115, a system 125 for providing a field current 127 and an arrangement or controller 103 for controlling the synchronous generator 105.

The generator 105 has a stator 129 including at least one stator winding 131 (e.g., three stator windings 131 providing three output terminals 133 of the generator 105 for three electrical phases). The stator windings 131 are established by respective wires 135. The generator 105 has a rotor 137 with an electromagnet 139 that is driven by the field current 127. Thereby, the rotor 137 is rotatable relative to the stator 129.

The system 125 for providing the field current 127 includes a rotating coil 141 that is mechanically coupled to the rotor 137, and a rotatable rectifier 143 that is mechanically coupled to the rotor 137 and electrically coupled to the rotating coil 141. The system 125 also provides the field current 127 to the electromagnet 139 of the rotor 137. Further, the system 125 for providing the field current 127 includes a stator electromagnet 145 that is inductively coupled to the rotating coil 141. Further, the system 125 for providing the field current 127 includes a stator electromagnet supply system 147 for supplying an exciting voltage from an output terminal 149 thereof to the stator electromagnet 145. Thereby, the stator electromagnetic supply system 147 is supplied with electric energy via input terminals 151 that are connected via a transformer 153 to the three output terminals 133 of the generator 105.

The stator electromagnet supply system 147 includes four isolated gate bipolar transistors 155 that are driven by a gate drive circuit 157 that receives control signals via signal lines 159 from the arrangement or controller 103 for controlling the synchronous generator 105.

The generator system 101 further includes an emergency stop switch 161 between the output terminals 149 of the stator electromagnet supply system 147 and the stator electromagnet 145 for shutting off a supply voltage.

The generator rectifier circuit 115 includes six diodes 163 that are arranged as three pairs of series connected diodes between two DC output terminals 180 of the generator system 101. The three phase output terminals 133 of the synchronous generator 105 are connected between two diodes 163 of each pair of diodes of the generator rectifier circuit 115.

The generator system 101 is configured and arranged to protect the diodes 163 from damage, for example, in case of a short circuit event caused by some defective load connected to the to the DC output terminals 180.

Therefore, the arrangement 103 acquires, using a not illustrated measurement system, at least one quantity, such as a stator current 167, an output current 165 and/or an output voltage 168 relating to the output of the generator 105. Further, the arrangement 103 may receive a temperature signal 169 (e.g., from temperature sensor 170) indicating the temperature of one or more of the diodes 163 of the generator rectifier circuit 115. Further, the arrangement 103 receives the measurement values 171 indicating the DC voltage between the DC output terminals 180. Further, the arrangement 103 receives one or more control signals from other controllers, such as the signals 173. Further, the arrangement 103 may be controlled by a human interface 175.

For example, the arrangement 103 (e.g., generator control module, profinet communication interface, household control 30 Hz to 120 Hz voltage, current and frequency measurements) is adapted to shut down the field current 127 in case of a malfunction of the generator or of any component connected directly or indirectly at the output terminals 133 of the generator 105.

Therefore, the controller 103 or the arrangement including the controller 103 and the measurement system for providing the current measurement signal are configured to cause shutting down the field current 127 if at least one of the quantities received satisfies at least one criterion associated with at least one malfunction.

For example, FIG. 3 illustrates a graph explaining one protection function of the controller 103 included in the generator system 101 illustrated in FIG. 2. On an abscissa 301, the time in seconds is indicated, while on an ordinate 302, the diode current 177 flowing through the diode 163 of the generator rectifier circuit 115 is indicated in Ampere.

The curve 303 indicates the diode current limit of the diodes 163. The curve 305 illustrates the actual diode current 177 flowing through the diode 163 after a short circuit on the DC bus 180, and after, the controller 103 has caused shutting down the field current 127 30 ms after the short circuit appeared. Before the short circuit appeared, the generator 105 was running at a frequency of 62.5 Hz and nominal conditions. As shown in FIG. 3, the actual current (curve 305) lies well below the current limit (curve 303) such that the diodes 163 of the generator rectifier 115 are protected from damage.

For example, the controller 103 may acquire measurement values relating to the stator (e.g., three phase current measurement, three phase voltage measurement, three phase mutual point current measurement and output frequency measurement).

Further, the controller 103 may acquire values that are related to the rectifier circuit 115 (e.g., DC measurement values, diode bridge temperatures, such as the signals 169 and 171).

Further, the controller 103 may acquire measurement values relating to the magnetization circuit 145, 147 (e.g., external magnetization circuit current, external magnetization circuit voltage, such as signals 177).

The generator system 101 is adapted to protect from short circuit, overvoltage, undervoltage, unbalanced load protection, differential current protection, overexcitation, underexcitation and inverse time over current (overload condition). Further, the generator system 101 is adapted for monitoring frequency, overspeed, temperature and fault history.

The term "comprising" does not exclude other elements or steps, and "a" or "an" does not exclude a plurality. Also, elements described in association with different embodiments may be combined. Reference signs in the claims should not be construed as limiting the scope of the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An arrangement for controlling a synchronous generator having a stator comprising at least one stator winding and having a rotor with an electromagnet driven by a field current, the rotor being rotatable relative to the stator, the electromagnet being inductively coupled to the at least one stator winding, a rectifier circuit being connected to an output terminal of the at least one stator winding, the rectifier circuit comprising two isolation switches and a diode bridge, the diode bridge comprising four or more diodes that are arranged as pairs of series connected diodes between two DC output terminals, the arrangement comprising:
   a measurement system configured to measure a quantity of the rectifier circuit; and
   a controller configured to shut down the field current based on the quantity of the rectifier circuit satisfying at least one criterion associated with at least one malfunction,
   wherein the quantity of the rectifier circuit is indicative of an operating condition of one or more diodes of the four or more diodes of the diode bridge of the rectifier circuit connected to the output terminal of the at least one stator winding, and
   wherein each isolation switch of the two isolation switches is disposed between the diode bridge and a respective DC output terminal.

2. The arrangement of claim 1, wherein the quantity of the rectifier circuit is indicative of a temperature of the diode bridge of the rectifier circuit connected at the output terminal of the at least one stator winding,
   wherein the at least one criterion comprises that the temperature is greater than a temperature threshold, or
   wherein the quantity of the rectifier circuit is further indicative of a DC voltage between DC output terminals of the rectifier circuit.

3. The arrangement of claim 1, wherein the quantity of the rectifier circuit is indicative of a temperature of the diode bridge of the rectifier circuit, and
   wherein the at least one criterion comprises that a change of the temperature is greater than a temperature change threshold.

4. The arrangement of claim 1, wherein the quantity of the rectifier circuit is indicative of an output voltage at an AC-output terminal of the at least one stator winding,
   wherein the at least one criterion comprises that the output voltage is greater than an output voltage upper threshold, and
   wherein the at least one malfunction is an overvoltage condition at the output terminal.

5. The arrangement of claim 1, wherein the quantity of the rectifier circuit is indicative of an output voltage at an AC-output terminal of the at least one stator winding,
- wherein the at least one criterion comprises that the output voltage is smaller than an output voltage lower threshold, and
- wherein the at least one malfunction is an under voltage condition at the output terminal.

6. The arrangement of claim 1, wherein the quantity of the rectifier circuit is indicative of an output frequency of an output voltage or output current at an AC-output terminal of the at least one stator winding,
- wherein the at least one criterion comprises that the output frequency deviates more than a frequency deviation threshold from a target frequency, and
- wherein the at least one malfunction is an erroneous frequency at the output terminal.

\* \* \* \* \*